United States Patent
Hattori et al.

(10) Patent No.: US 6,846,470 B2
(45) Date of Patent: Jan. 25, 2005

(54) METHODS FOR PRODUCING INDIUM-CONTAINING AQUEOUS SOLUTIONS CONTAINING REDUCED AMOUNTS OF METAL IMPURITIES

(75) Inventors: Takeshi Hattori, Abiko (JP); Shinji Fujiwara, Tsukuba (JP); Kunio Saegusa, Tsukuba-gun (JP)

(73) Assignee: Sumitomo Chemical Company, Limited, Osaka (JP)

(*) Notice: Subject to any disclaimer, the term of this patent is extended or adjusted under 35 U.S.C. 154(b) by 166 days.

(21) Appl. No.: 10/062,721

(22) Filed: Feb. 5, 2002

(65) Prior Publication Data

US 2002/0153521 A1 Oct. 24, 2002

(30) Foreign Application Priority Data

Feb. 6, 2001 (JP) ........................ 2001-029314

(51) Int. Cl.$^7$ .............................................. C01G 15/00
(52) U.S. Cl. ........................... 423/24; 423/70; 423/100; 423/112; 423/139; 423/DIG. 14; 210/681; 210/688
(58) Field of Search .................. 423/DIG. 14, 24, 423/112, 70, 100, 139; 210/681, 688, 698

(56) References Cited

U.S. PATENT DOCUMENTS

| | | | |
|---|---|---|---|
| 4,292,284 A | | 9/1981 | Tomii et al. |
| 4,517,096 A | * | 5/1985 | Sekine et al. ............... 210/668 |
| 4,565,673 A | * | 1/1986 | Kataoka et al. ............. 423/112 |
| 4,594,182 A | | 6/1986 | Hashimoto et al. |
| 5,316,683 A | * | 5/1994 | Haesebroek et al. ........ 210/688 |
| 6,162,648 A | * | 12/2000 | Maloney et al. ............ 436/178 |
| 6,319,483 B1 | * | 11/2001 | Kudo et al. ................. 423/127 |

FOREIGN PATENT DOCUMENTS

| | | |
|---|---|---|
| JP | 3-75224 A | 3/1991 |
| JP | 3-82720 A | 4/1991 |
| JP | 2001-40434 A | 2/2001 |

\* cited by examiner

*Primary Examiner*—Steven Bos
(74) *Attorney, Agent, or Firm*—Sughrue Mion, PLLC

(57) ABSTRACT

A method for producing an indium-containing aqueous solution having a reduced amount of metal impurities is provided. A method for producing an indium-containing aqueous solution having a reduced amount of metal impurities which comprises bringing an aqueous solution containing indium and metal impurities whose hydrogen ion concentration is adjusted at 0.5 mol/L to 3 mol/L into contact with a non-chelate ion-exchange resin to remove the metal impurities, and a method for producing an indium-containing aqueous solution having a reduced amount of metal impurities which comprises bringing an aqueous solution containing indium and metal impurities into contact with a chelate ion-exchange resin to remove the metal impurities are provided.

9 Claims, No Drawings

METHODS FOR PRODUCING INDIUM-CONTAINING AQUEOUS SOLUTIONS CONTAINING REDUCED AMOUNTS OF METAL IMPURITIES

FIELD OF THE INVENTION

The present invention relates to a method for producing an indium-containing aqueous solution having a reduced amount of metal impurities, especially to a method for producing an indium-containing aqueous solution having a reduced amount of metal impurities from an aqueous solution containing indium and metal impurities recovered from the scrap of an ITO sintered article (ITO stands for Indium-Tin-Oxide, and is an indium oxide-tin oxide solid solution).

BACKGROUND OF THE INVENTION

Since an ITO thin film containing 2 to 20% by mass of tin oxide has a high electric conductivity and an excellent light transmission performance, it is employed as a transparent conductive film for a transparent electrode of a liquid crystal display.

An ITO thin film is produced mainly by a spattering method using an ITO target, and a sintered article produced by molding and sintering an ITO powder or by molding and sintering a powder mixture of an indium oxide powder and a tin oxide powder is employed as an ITO target.

One of the problems encountered when forming a transparent conductive film by a spattering method using an ITO target is a low availability of the ITO target.

An ITO sintered article as an ITO target undergoes a reduction in its mass in response to its history of being used in the spattering. In general, the quality of a transparent conductive film is ensured by replacing an ITO target with a new one at a reduction in the mass of the ITO sintered article within the range of 20 to 80% by mass. Since the ITO sintered article as a wasted ITO target (ITO sintered article scrap) contain a substantial amount of indium which is a rare resource and expensive, a highly pure elemental indium or indium compound is recovered from such wasted ITO target.

For example, Japanese Unexamined Patent Publication No. 3-75224 discloses a method for separating tin and indium by dissolving a wasted ITO target in hydrochloric acid, preparing an aqueous solution containing indium and tin, adding ammonium ion or sodium ion and then generating a halogenostannate. However, this method is unsuccessful in separating metals other than tin from indium.

Japanese Unexamined Patent Publication No. 3-82720 discloses a complicated method comprising reducing an ITO scrap solution, adjusting pH from 2 to 5 to precipitate an indium component as a hydroxide, dissolving the hydroxide in an acid, allowing indium to be adsorbed on a non-chelate ion-exchange resin and then allowing the adsorbed indium to be desorbed.

An object of the invention is to provide a simple method for producing an indium-containing aqueous solution having a reduced amount of metal impurities.

SUMMARY OF THE INVENTION

The applicants made an effort under the circumstance described above to solve the problems discussed above, and finally discovered, that an indium-containing aqueous solution having a reduced amount of metal impurities can be obtained by removing the metal impurities from an aqueous solution containing indium and metal impurities whose hydrogen ion concentration is adjusted within a certain range using a non-chelate ion-exchange resin or by removing the metal impurities from an aqueous solution containing indium and metal impurities using a chelate ion-exchange resin.

Thus, the present invention provides a method for producing an indium-containing aqueous solution having a reduced amount of metal impurities which comprises bringing an aqueous solution containing indium and metal impurities whose hydrogen ion concentration is adjusted at 0.5 mol/L to 3 mol/L into contact with a non-chelate ion-exchange resin to remove the metal impurities, and a method for producing an indium-containing aqueous solution having a reduced amount of metal impurities which comprises bringing an aqueous solution containing indium and metal impurities into contact with a chelate ion-exchange resin to remove the metal impurities.

DETAILED DESCRIPTION OF THE INVENTION

The present invention is further detailed below.

The invention provides two types of the method for producing an indium-containing aqueous solution having a reduced amount of metal impurities, one involving a use of a non-chelate ion-exchange resin and one involving a use of a chelate ion-exchange resin, for removing the metal impurities from an indium-containing aqueous solution. In the case of using a non-chelate ion-exchange resin, the hydrogen ion concentration of an indium-containing aqueous solution is adjusted at 0.5 mol/L to 3 mol/L. A hydrogen ion concentration of an indium-containing aqueous solution less than 0.5 mol/L allows not only the metal impurities but also indium ion to be adsorbed. On the other hand, a hydrogen ion concentration of an indium-containing aqueous solution exceeding 3 mol/L allows almost all of the metal impurities to remain unabsorbed, resulting in an unsuccessful removal. The applicants discovered that by adjusting the hydrogen ion concentration of an indium-containing aqueous solution within the range from 0.5 mol/L to 3 mol/L the metal impurity level of an indium-containing aqueous solution can be reduced using a non-chelate ion-exchange resin. In another method of the invention which employs a chelate ion-exchange resin, the hydrogen ion concentration of an indium-containing aqueous solution is preferably 0.5 mol/L to 12 mol/L.

A chelate ion-exchange resin employed in a production method according to the invention is a resin having an ability of adsorbing a single ion as a result of the binding of two or more functional groups to this single ion, and is one of the ion-exchange resins. A non-chelate ion-exchange resin in a production method according to the invention is a resin having an ability of adsorbing a single ion as a result of the binding of a single functional group to this single ion.

An indium-containing aqueous solution employed as a starting material is discussed below.

While an indium-containing aqueous solution employed in a production method according to the invention is not limited particularly, one employed preferably by the inventive production method is an aqueous solution containing indium and the metal impurities obtained by dissolving an indium-containing sintered article in an acidic aqueous solution. The indium-containing sintered articles are, for example, an ITO sintered article scrap (hereinafter a scrap means one recovered from a wasted target), an In-Zn-based oxide sintered article scrap, an ITO sintered article which was broken during the production and an In-Zn-based oxide sintered article which was broken during the production. A production method of the invention may also employ an aqueous solutions containing indium and the metal impurities obtained by dissolving an indium-containing powder such as a chip generated during a cutting or grinding process of an ITO sintered article, a hip generated during a cutting or grinding process of an In-Zn-based oxide sintered article, an ITO powder containing 10 ppm by mass or more of Fe and/or 10 ppm by mass or more of Al and/or 10 ppm by mass or more of Cu and/or 10 ppm by mass or more of Zn, and an In-Zn-based oxide containing 10 ppm by mass or more of Fe and/or 10 ppm by mass or more of Al and/or 10 ppm by mass or more of Cu in an acidic aqueous solution.

In a production of an aqueous solution containing indium and metal impurities employed in an inventive production method, an acid in an acidic aqueous solution employed for dissolving a material containing an indium oxide may, for example, be hydrochloric acid, sulfuric acid, aqua regia, nitric acid and the like. Hydrochloric acid exhibiting the highest dissolution rate is preferred.

The following discussion is made with exemplifying an ITO sintered article scrap as a material containing indium oxide.

Since an ITO target after being used in a spattering possesses an ITO sintered article scrap as being bound to a backing plate, an ITO sintered article scrap once after removed from the backing plate frequently has a deposition of Cu or a waxy material as a constituent of the backing plate, and in such case it is preferable to remove such deposition preliminarily using an acidic aqueous solution such as hydrochloric acid, nitric acid or aqua regia.

It is also preferable that an ITO sintered article scrap is ground prior to the dissolution in an acidic aqueous solution for the purpose of promoting the dissolution in the acidic aqueous solution. While a method for such grinding is not limited particularly, it may employ known jaw crasher, roll crasher, roll mill, hammer mill, stamp mill and vibration mill. While a grinder is made preferably from a wearing-resistant material such as alumina or zirconia, the migration of Al or Zr as impurities into an ITO can not be avoided. The particle size of an ITO scrap after being ground is usually 10 mm or less, preferably 1 mm or less, more preferably 0.5 mm or less.

Subsequently, a ground ITO sintered article scrap is dissolved in an acidic aqueous solution, whereby obtaining an aqueous solution containing indium and metal impurities employed in a production method according to the invention. When hydrochloric acid is employed as an acid in an acidic aqueous solution employed for the dissolution, the concentration of hydrochloric acid in the aqueous solution is usually 5% by mass or higher, preferably 10% by mass or higher, more preferably 20% by mass or higher. An aqueous solution of hydrochloric acid at a higher concentration leads to a higher dissolution rate of an ITO sintered article scrap.

While a method for dissolving an ITO sintered article scrap is not limited particularly, it is conducted preferably with heating and stirring. The dissolution temperature is within the range from 30° C. to 100° C., preferably 50° C. to 100° C., more preferably 60° C. to 90° C. The dissolution time may vary depending on the amount of the solute, the concentration and the temperature of an acidic aqueous solution and the like.

When an ITO solution obtained through the dissolution step described above (an aqueous solution containing indium and metal impurities) contains any undissolved ITO sintered article, such undissolved ITO sintered article may be removed by a filtration.

In a production method according to the invention, an ITO solution obtained by a method exemplified above is first adjusted at a hydrogen ion concentration and then brought into contact with an ion-exchange resin to remove the metal impurities. While a method for adjusting the hydrogen ion concentration is not limited particularly, it may for example be a method in which an ion-exchange water is added to the solution, a method in which an acid substance is added to the solution, a method in which the weight ratio between the acid for dissolving an ITO sintered article scrap in an acidic aqueous solution and the ITO sintered article scrap is altered, and a method in which an alkaline substance is added. An embodiment of an inventive production method in which an aqueous solution containing indium and metal impurities is brought into contact with an ion exchange resin preferably comprises filling the ion exchange resin in a cylindrical container and passing the indium-containing aqueous solution from one side of the cylindrical container through the other side to effect a continuous purification of the indium-containing aqueous solution.

A non-chelate ion-exchange resin employed in an inventive production method may for example be, but not limited to, the commercial products having the trade names "*DOWEX MONOSPHERE* 650 C (DOW CHEMICAL COMPANY), "*DOWEX* 50 W" (DOW CHEMICAL COMPANY), "*DIAION* SKIB" (MITSUBISHI CHEMICAL), "*DUOLITE* C255LFH" (SUMITOMO CHEMICAL) and the like. An ion-exchange resin can be regenerated and used again by washing it with an acid such as hydrochloric acid or sulfuric add.

Since the impurities reduced significantly by a non-chelate ion-exchange resin is iron and aluminum in a production method of the invention, the production method of the invention is best suited for the reduction in the concentration of iron and/or aluminum in an indium-containing aqueous solution which contains iron and/or aluminum as the impurities. A non-chelate ion-exchange resin is preferably a cation exchange resin having a sulfonate group as an exchanging group because of a higher ability of reducing the concentration of impurities.

A chelate ion-exchange ion in a production method of the invention may or example be, but not limited to, the commercial products having the trade names "*DUOLITE* C467" (SUMITOMO CHEMICAL), "*SUMICHELATE* MC700" (SUMITOMO CHEMICAL), "*MUROCHE-LATE* A-1" (MUROMACHI KAGAKU), "*DIAION" CR11" (MITSUBISHI CHEMICAL) and the like. A chelate ion-exchange resin can be regenerated and used again by washing it with an acid such as hydrochloric acid or sulfuric acid or with an alkali such as sodium hydroxide or potassium hydroxide.

Since the impurities reduced significantly by a chelate ion-exchange resin is iron, zinc, zirconium, copper and tin in a production method of the invention, the production method of the invention is best suited for the reduction in the concentration of the metal ions listed above in an aqueous solution containing indium and metal impurities whose impurities consist of at least one selected from the group consisting of iron, zinc, zirconium, copper and tin. A chelate ion-exchange resin is preferably one especially having an aminophosphate group or an iminodiacetate group as an exchanging group because of a higher ability of reducing the concentration of impurities. A chelate ion-exchange resin is preferably used at the temperature range from 40° C. to 100° C. because of a higher ability of reducing the concentration of impurities.

A production method of the invention allows an indium-containing aqueous solution having a reduced amount of metal impurities to be obtained by reducing the metal impurity concentration in an aqueous solution containing indium and metal impurities using a simple process involving a contact with an ion-exchange resin. The recovery rate of indium by the inventive production method is as high as 90% or more. Repeating the inventive process twice or more can further reduce the impurity concentration versus indium in the recovered solution.

According to a method of the invention, an aqueous solution containing indium and metal impurities whose indium concentration is extremely high can be employed, whereby eliminating the need of a condensation step during the production of an ITO powder from an aqueous solution of indium whose metal impurities are reduced, resulting in a high volume efficiency, which is another advantageous aspect of the invention.

An indium-containing aqueous solution having a reduced amount of metal impurities obtained according to a production method of the invention is mixed with an alkaline aqueous solution to effect a neutralization whereby recovering a precipitate containing indium. Those which can be exemplified are a method in which an alkaline aqueous solution is added to an indium-containing aqueous solution having a reduced amount of metal impurities and a method in which an indium-containing aqueous solution having a reduced amount of metal impurities and an alkaline aqueous solution are supplied simultaneously to water at 40° C. or higher but lower than 100° C. to effect a reaction while keeping the pH during the reaction within the range from 4 to 6 to obtain an indium-containing precipitate.

EXAMPLES

The invention is further described in detail in the following Examples, which are not intended to restrict the invention.

A hydrogen ion concentration in EXAMPLES was calculated from a value obtained by determining an indium-containing aqueous solution, which had been subjected to a 100-fold dilution, using a pH meter (TOA DENPA KOGYO, Model HM-20S). Each metal impurity level was determined using an ICP emission analyzer. A value in ppm shown below is a ppm by mass.

Example 1

An ITO sintered article was ground using a 2-L alumina pot (manufactured by NIKKATO CORPORATION) and a zirconia ball (manufactured by NIKKATO CORPORATION, 15 mmφ, TYZ ball) in a vibration mill (YASUKAWA DENKI, Vibo-Pot) to obtain a powder of 60 mesh size or less, 300 g of which was then added to 700 g of a 35% aqueous solution of hydrochloric acid and allowed to dissolve with stirring at 80° C. for 9.5 hours, and then filtered with suction to remove any undissolved ITO, whereby preparing an ITO solution. The hydrogen ion concentration of the solution was determined and was 1.2 mol/L. Metal ion concentrations in this aqueous solution were In=345 g/L, Sn=17.6 g/L, Fe=0.0081 g/L, and Al=0.0037 g/L. 200 mL of this solution was applied onto a 20 mmφ column packed with 40 ml of a cation exchange resin (SUMITOMO CHEMICAL, *DUOLITE* C255LFH") at the flow rate of 15 ml/min, and an indium-containing aqueous solution as an effluent was recovered. Table 1 shows Fe/In and Al/In before and after the purification as well as removal rate of each ion.

TABLE 1

| Before purification Fe/In | After purification Fe/In | % Fe removal | Before purification Al/In | After purification Al/In | % Al removal |
|---|---|---|---|---|---|
| 24 ppm | 16 ppm | 33% | 11 ppm | 5 ppm | 55% |

Example 2

A 1075-gram bulk of an ITO sintered article which had been ground into a size of 1 to 2 cm was added to 948 g of a 35% aqueous solution of hydrochloric acid and subjected to a dissolution treatment with stirring at 80° C. for 82 hours, and then filtered with suction to remove any undissolved ITO, whereby preparing an ITO solution. The solution was combined with an ion-exchange water to adjust the hydrogen ion concentration at 1.2 mol/L. Metal ion concentrations in this aqueous solution were In=191 g/L, Sn=19.8 g/L, Zr=0.0297 g/L, Fe=0.0183 g/L and Zn=0.0025 g/L. A 20 mmφ column packed with 70 ml of a chelate ion-exchange resin (SUMITOMO CHEMICAL, "*DUOLITE* C467") was washed by eluting with 350 ml of the ion-exchange water at the flow rate of 1.5 ml/min. 270 ml of the solution was applied at the flow rate of 1.5 ml/min, and an indium-containing aqueous solution as an effluent was recovered. The column was further eluted with 200 ml of the ion-exchange water at the flow rate of 1.5 ml/min to recover any metal ions remaining in the mobile phase of the column forcibly in the effluent. Zr/In was reduced from 156 ppm to 0.2 ppm, while Fe/In was reduced from 96 ppm to 15 ppm. The In recovery rate including In contained in the ion-exchange effluent was 95%.

Example 3

The procedure similar to that in Example 1 was employed to grind and dissolve am ITO sintered article and add the ion-exchange water to adjust the hydrogen ion concentration of the solution at 0.9 mol/L. Metal ion concentrations in this aqueous solution were In=211 g/L, Sn=23.0 g/L, Zr=0.0280 g/L, Fe=0.0179 g/L, and Zn=0.0023 g/L.

A chelate ion-exchange resin (SUMITOMO CHEMICAL, "*DUOLUTE* C467") was washed with a 5N aqueous solution of HCl and the ion-exchange water, and 10 ml of the resin was packed in a 20 mmφ column. 120 ml of the solution was applied to the column at the flow rate of 1.5 ml/min, and an indium-containing aqueous solution as an effluent was recovered. The column was further eluted with 30 ml of the ion-exchange water at the flow rate of 1.5 ml/min to recover any metal ions remaining in the mobile phase of the column forcibly in the effluent. Zr/In was reduced from 133 ppm to 3 ppm, while Zn/In was reduced from 11 ppm to 3 ppm. The In recovery rate including In contained in the ion-exchange effluent was 91%.

Example 4

Indium-containing aqueous solution was prepared by dissolving indium metal with aqueous solution of hydrochloric acid. Metal ion concentrations of the solution were In=320 g/L and Fe=0.030 g/L, and the hydrogen ion concentration of the solution was 3 mol/L, 1041 mL of this solution was applied onto a 20 mmφ column packed with 40 mL of a chelate ion-exchange resin (SUMITOMO CHEMICAL, "*DUOLITE* C467"), which was washed with a 5N aqueous solution of HCl and the ion-exchange water, at the flow rate of 1.5 mL/min at 60° C. An indium-containing aqueous solution as an effluent was recovered. Fe/In was reduced from 93 ppm to 8 ppm by the purification. The In recovery rate was 100%.

Example 5

The procedure similar to that in Example 1 was employed to grind and dissolve an ITO sintered article and add the ion-exchange water to adjust the hydrogen ion concentration of the solution at 0.6 mol/L. Metal ion concentrations in this aqueous solution were In=75 g/L, Sn=5.5 g/L, Zr=0.0054 g/L, Fe=0.0007 g/L, Zn=0.0003 g/L, and Cu=0.0056 g/L. 70 ml of a chelate ion-exchange resin (SUMITOMO CHEMICAL, "*SUMICHELATE* MC700") was packed in a 20 mmφ column, and washed with the ion-exchange water. 460 ml of the solution was applied to the column at the flow rate of 1.5 ml/min, and an indium-containing aqueous solution as an effluent was recovered The column was further eluted with 200 ml of the ion-exchange water at the flow rate of 1.5 ml/min to recover any metal ions remaining in the mobile phase of the column forcibly in the effluent. Cu/In was reduced from 74 ppm to 27 ppm. The In recovery rate including In contained in the ion-exchange effluent was 100%.

According to a production method of the invention, an indium-containing aqueous solution having a reduced amount of metal impurities can be obtained by removing the metal impurities from an aqueous solution containing indium and the metal impurities using an extremely convenient process. Especially due to a successful regeneration of an ITO powder having a reduced amount of metal impurities at a low cost from an ITO sintered article scrap as a wasted ITO target, an extremely high industrial utility is achieved.

What is claimed is:

1. A method for producing an indium-containing aqueous solution having a reduced amount of metal impurities which comprises bringing an aqueous solution containing indium and metal impurities whose hydrogen ion concentration is adjusted at 0.5 mol/L to 3 mol/L into contact with a non-chelate ion-exchange resin to remove the metal impurities.

2. The method according to claim 1, wherein the ion exchange resin is a cation exchange resin having a sulfonate group as an exchanging group.

3. The method according to claim 1, wherein the metal impurities consists of at least one of iron and aluminum.

4. The method according to claim 1, wherein the aqueous solution containing indium and metal impurities is formed by dissolving at least one of an indium-containing sintered material or an indium-containing powder in an acidic aqueous solution.

5. A method for producing an indium-containing aqueous solution having a reduced amount of metal impurities which comprises bringing an aqueous solution containing indium and metal impurities into contact with a chelate ion-exchange resin to remove the metal impurities, wherein the aqueous solution containing indium and metal impurities is an aqueous solution whose hydrogen ion concentration is adjusted at 0.5 mol/L to 12 mol/L.

6. The method according to claim 5, wherein the chelate ion-exchange resin is an ion-exchange resin having an aminophosphate group or an iminodiacetate group as an exchanging group.

7. The method according to claim 5, wherein the temperature at which the aqueous solution was brought into contact with the chelate ion-exchange resin is 40° C. to 100° C.

8. The method according to claim 5, wherein the metal impurities consist of at least one selected from the group consisting of iron, zinc, zirconium and copper.

9. The method according to claim 5, wherein the aqueous solution containing indium and metal impurities is formed by dissolving at least one of a indium-containing sintered material or an indium-containing powder in an acidic aqueous solution.

* * * * *